United States Patent [19]
Dandini

[11] 3,933,115
[45] Jan. 20, 1976

[54] SPHERICAL ROLLING HULL MARINE VESSEL

[76] Inventor: Alessandro O. Dandini, 101 Greenridge Drive, Reno, Nev. 89502

[22] Filed: Feb. 8, 1974

[21] Appl. No.: 440,793

[52] U.S. Cl. ............................. 115/19; 114/77 R
[51] Int. Cl.² ........................................ B63H 1/38
[58] Field of Search ......... 115/49, 19, 20; 114/43.5, 114/77 R, 77 A

[56] References Cited
UNITED STATES PATENTS

| | | | |
|---|---|---|---|
| 1,905,345 | 4/1933 | Dandini | 115/20 |
| 2,309,875 | 2/1943 | Thompson | 115/19 |
| 3,348,513 | 10/1967 | Dishart | 114/77 R |
| 3,687,309 | 8/1972 | Macrander | 114/43.5 |

FOREIGN PATENTS OR APPLICATIONS

| | | | |
|---|---|---|---|
| 11,444 | 7/1903 | United Kingdom | 115/19 |

Primary Examiner—Trygve M. Blix
Assistant Examiner—Gregory W. O'Connor
Attorney, Agent, or Firm—Murray K. Hatch

[57] ABSTRACT

A marine vessel with a spherical rolling hull having a rotatably mounted shaft disposed through the horizontal poles of the sphere. A frame assembly is rigidly fixed to the shaft on the interior of the sphere for carrying a propulsion apparatus and cargo. The propulsion apparatus operates to turn wheels supporting the frame assembly and running upon a pair of annular tracks on the sphere's interior surface so as to cause the sphere to rotate. This rotational effect propels the vessel by means of fins or paddles on the outer surface of the sphere. Air propellers, elevators, and rudders to assist in navigation are mounted on the exterior of a pair of elongated cabins which are detachably connected to the shaft's terminals at the sides of the hull. Cargo and passengers are carried by these cabins which also can serve as independently powered, seaworthy marine vessels when detached from the mother ship. To expedite the handling of cargo, elevators are provided in the undercarriage of each cabin.

4 Claims, 6 Drawing Figures

SPHERICAL ROLLING HULL MARINE VESSEL

BACKGROUND OF THE INVENTION

This invention relates to a SPHERICAL ROLLING HULL MARINE VESSEL and more particularly to vessels for moving cargo and passengers over water.

Marine vessels are generally classified as commercial, naval and recreational. Commercial and naval vessels are usually large by necessity and when moving they are retarded by energy consuming drag forces. As the depth of the draft increases, this resistance becomes greater and limits the vessel's practical speed.

Recreational vessels however, usually have a low drag profile and as a result high speeds are possible. However, generally they do not have the capacity to carry large loads of cargo or passengers and this limits their practical use. Marine vessels which have a revolving supporting surface and low drag profiles when travelling have been shown by the prior art and particularly by applicant's U.S. Pat. No. 1,905,345. However, these vessels have had limited capability for loading, unloading, and storage of cargo. Although these vessels can obtain high speeds by travelling on rather than in the water, their value for quickly transporting cargo has been limited. And they have not been able to pick up or drop off cargo rapidly. No secondary seaworthy transportation system has been provided by the prior art vessels for saving passenger lives and cargo in the event of an emergency.

BRIEF SUMMARY OF THE INVENTION

The present invention provides an improved spherical hull marine vessel for transporting passengers and cargo rapidly and is particularly adapted for quickly loading and unloading cargo.

It provides for a fast turnaround when unloading and loading cargo which results in a highly efficient water transportation vessel. High speeds can be obtained as it moves on the water and thereby creates little resistance, compared to its buoyancy, due to the low drag profile in water and the rolling action of the spherical hull.

The vessel has three cargo storage areas. They are on the main frame assembly, which also carries the vessel's power generating equipment, located on the sphere's interior, in cabins mounted exterior to the sphere, and on the underside of these cabins. Several tons of cargo may be carried underneath each cabin which are equipped with elevators adapted to raise a standard cargo container from a barge or a dock, to hold it against the bottom of the cabin during transportation, and to deposit it at the point of arrival. The elevator system can also be used to handle vehicles such as trucks or tanks, landing craft, heavy motors and other heavy and bulky cargo.

The cabins have releasable connections to allow the operator to disengage them from the spherical hull in the event of emergency. Moreover, the cabins have water tight bottoms, propellers, rudder mechanisms, controls, independent power, and in themselves provide mobility and seaworthiness comparable to a standard marine vessel, so they can be used as life craft.

The present invention therefore consists of a spherical supporting surface, a rotatably mounted shaft in the horizontal poles of the sphere with elongated cabins detachably connected to the shaft terminals outside the hull. A primary propulsion means, carried by a frame rigidly fixed to the shaft, is operatively connected to annular tracks on the sphere's interior so as to cause the sphere to rotate. An auxiliary air propulsion means is provided at the anterior of each cabin. Air rudders and elevators are located at the aft end of each cabin to assist in steering, braking, and stabilizing the marine vessel. To increase the vessel's speed the sphere is rotated faster and more power is applied to the air propulsion means.

It is therefore a principal object of the present invention to provide a spherical hull vessel particularly adapted for rapid and efficient transportation of cargo and passengers along waterways.

Another object of the present invention is to provide a marine vessel of the character described which is driven over the water surface by means of both a revolving hull and air propellers.

A further object of the present invention is to provide a marine vessel of the character described having a plurality of passenger and cargo compartments both inside and outside the hull.

A still further object of the present invention is to provide a spherical hull marine vessel with outside cabins which are quickly detachable, in case of emergency, and which have independent power propulsion and navigational means to act as life craft.

Another object of the present invention is to provide a spherical hull marine vessel with multiple locomotion means and with a sensitive navigational system for controlling speed and bearing.

A still further object of the present invention is to provide a marine vessel of the character set forth which is capable of accommodating a wide variety of cargo classifications.

Yet another object of the present invention is to provide a spherical marine vessel which may be run by a small crew and is relatively inexpensive to build and operate.

Another object of the present invention is to provide a marine vessel capable of rapidly picking up and dropping off cargo so as to provide for fast turnaround.

Further objects and advantages of the present invention will become apparent as the specification proceeds and the new and useful features will be fully defined in the claims.

BRIEF DESCRIPTION OF THE DRAWINGS

The preferred form of the present invention is illustrated in the accompanying drawings in which.

Figure 1:
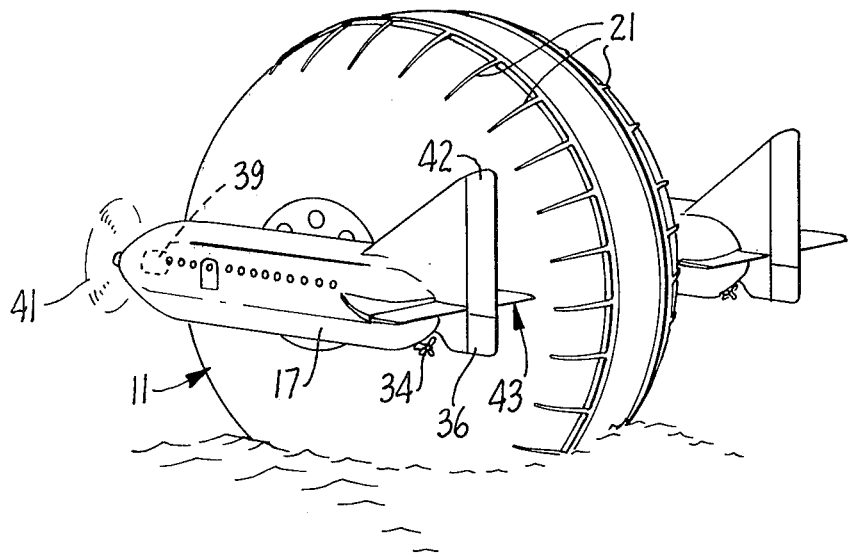
FIG. 1 is a perspective view of a marine vessel with a spherical rolling hull and attached elongated cabins made in accordance with the present invention.
Figure 2:
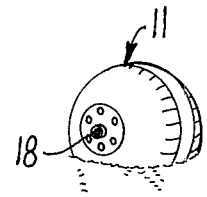
FIG. 2 is a perspective view showing one of the cabins detached from the mother ship and floating in the water.
Figure 2:
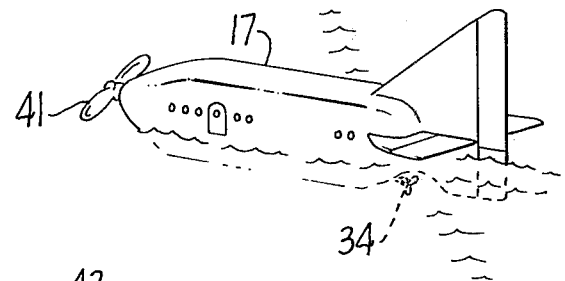
Figure 3:
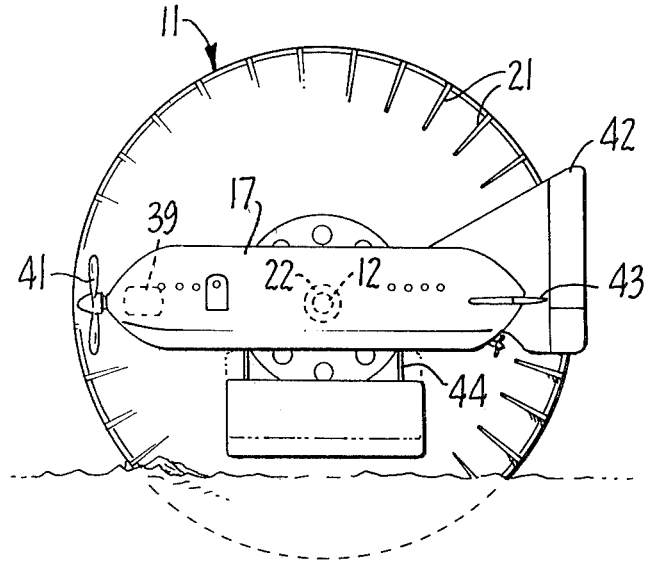
FIG. 3 is a side elevational view of the marine vessel showing the operation of cargo elevators for moving cargo between raised and lowered positions, with cargo shown in phantom in the raised position.
Figure 4:
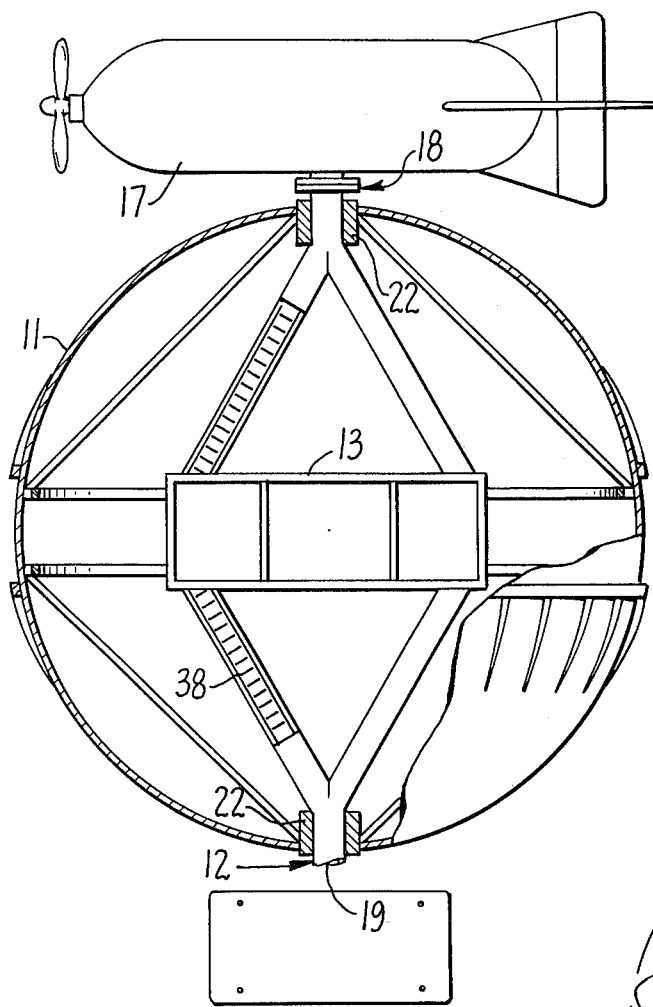
FIG. 4 is a plan sectional view, with parts broken away, taken substantially on plane 4—4 of FIG. 3 and showing the hull interior.

While only the preferred form of the invention has been shown in the drawings it will be apparent that changes and modifications could be made hereto within the ambit of the invention as defined in the claims.

DESCRIPTION OF THE PREFERRED EMBODIMENT

Referring to drawings in detail it will be seen that the marine vessel of the present invention includes a spherical hull 11 and a shaft means 12 rotatably mounted in the horizontal poles of the sphere. Carried within the sphere and rigidly fixed to shafts 12 is a frame assembly 13 designed to carry a propulsion means 14 and cargo. A rotational means 16 is operatively connected to the interior surface of spherical hull 11 and to propulsion means 14. Elongated cabins 17 are attached to the terminal portions of shaft means 12 by releasable coupling means 18. A passageway is provided between elongated cabins 17 and frame assembly 13.

As shown here waterproof bearings 22 located at the horizontal poles of spherical hull 11 permit the shaft means 12 to revolve freely with respect to the sphere so the cabins 17 and frame assembly 13 remain relatively level while the sphere rolls across the water. The rotation of the spherical hull is provided by the propulsion means 14 carried by frame 13 and having an engine 23 adapted to drive an electric generator 24 for charging storage batteries 26. Electricity is supplied by batteries 26 for operating electric motors 27 carried by trunks 28 and driving wheels 29. Any suitable form of power may be employed and electrical means is shown here merely as an illustration. The wheels 29 are adapted to ride upon a pair of annular tracks 31 rigidly fixed to the interior surface of spherical hull 11.

Fins or paddles 21 on the hull 11 provide for a frictional grip upon the water surface to propel the hull in accordance with its rotation. These paddles 21 are preferably disposed on the exterior of the sphere corresponding to the internal annular tracks 31.

To give added power for higher speed and to assist in the navigation of the ship, air propulsion is provided by motors 39 and propellers 41 shown in FIG. 1 as being mounted at the anterior ends of cabins 17. On the aft end of each of cabins 17 are mounted an air rudder 42 and an elevator 43. The propellers by throwing back a column of air upon the rudders and elevators create an effective means for directing the craft especially when it is moving at low speeds. The elevator acts to stabilize the vessel and permits high speeds.

Figure 6:
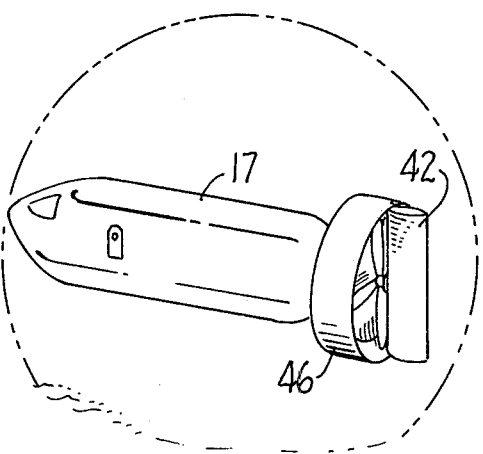
FIG. 6 is a perspective view with parts broken away showing an alternate embodiment of the invention having a propeller on the aft section of the cabin, immediately in front of the rudder.

Alternately, as shown in FIG. 6, the propellers 41 may be located in the aft ends of cabins 17, immediately in front of the rudder 42 so as to allow a reduction in the size of rudder required by directing a greater portion of the propellers flow of air over the rudder surface. This effect is enhanced by providing a cowling 46 encircling propellers 41 to provide a ducted fan configuration.

Equilibrium of the marine vessel is maintained primarily by the vertical flywheel effect produced by the rotation of annular tracks 31, the weight of frame assembly 13 and its connected components, and by stabilizing gyroscope 32 which is mounted upon frame assembly 13 and operated by a motor 33. Any suitable controls may be employed for the operation of the several motors.

Access to the ship's machinery and interior cargo area carried by frame assembly 13 is provided by a passageway 19 through shaft means 12 which is hollow. Ladders 38 are fixed to the frame assembly 13 to permit easy passage from the hollow shaft means 12 to the lower parts of the frame assembly.

Preferably, and as shown here, the cargo is carried both by frame assembly 13 within the hull and in elongated cabins outside the hull. Several tons of cargo may be secured to the undercarriage of each cabin. Elevators 44, of conventional construction, are provided to raise, hold, and deposit these loads. This elevator is capable of handling standard cargo containers, is power operated, remotely controllable and is mounted in the undercarriage of said elongated cabins.

The spherical hull vessel of the present invention is driven by energizing the motors 27, which turn wheels 29 upon annular tracks 31 and thereby rotationally displace the frame assembly 13 and its attached components. These components are massive and consist of the propulsion means 14, the shaft means 12, and the elongated cabins 17. The composite center of gravity of these components is well below the center line of shaft means 12, making the ship inherently stable. The displacement of frame assembly 13 is along the annular tracks 31 which form an endless path on the interior circumference of the sphere and upon which wheels 29 ride.

Figure 5:
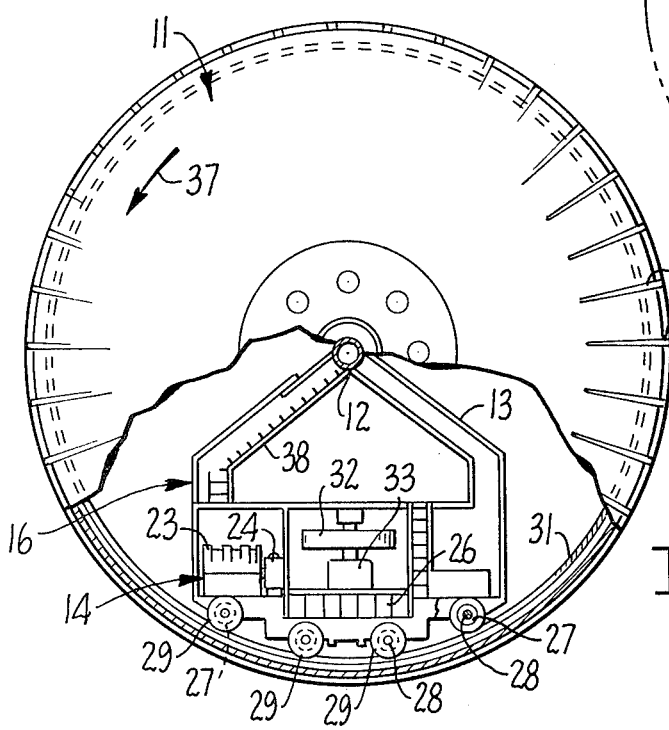
FIG. 5 is a side elevational view of the spherical hull with portions broken away to show the arrangement of parts in the interior of the hull.

The natural force of gravity acts to eliminate the described displacement, causing the frame assembly 13 to tend towards its stationary position directly under shaft means 12, thereby causing spherical hulls 11 to rotate as indicated by directional arrows 37, (See FIG. 5). The rotation of the sphere acts to lift it upon the water surface. Water drag decreases as the speed of rotation increases. The fins or paddles 21 provide for the translation of the sphere's rotary motion into the kinetic locomotion of the vessel. Motors 39 and air propellers 41 provide for additional propulsion and by throwing back a column of air upon elevators 43 and rudders 42 they provide for turning and stabilizing of the marine vessel in accordance with conventional aerodynamics.

Elongated cabins 17 are releasably connected to the terminals of shaft 12 by coupling means 18 such as a quick release flange with explosive bolts. The elevators 44 are provided with similar quick releases. These cabins are independently powered by water propellers 34, guided by rudder mechanism 36, and are seaworthy marine vessels when detached from the mother ship.

From the foregoing it will be seen that the marine vessel of the present invention provides an improved means for rapidly transporting passengers and cargo, utilizing both a spherical revolving hull and air propulsion. Cabins are provided which serve as life ships to save passengers and cargo in an emergency. Provisions have been included to permit the transportation of large payloads of cargo and for rapid elevating, holding and lowering of cargo for fast turnarounds.

I claim:

1. A marine vessel for rapidly transporting passengers and cargo, comprising a spherical hull, a hollow shaft means rotatably mounted in the horizontal poles of said spherical hull, a frame assembly rigidly fixed to said shaft means in the interior of said sphere, a propulsion means carried by said frame assembly and operatively connected to the interior of said spherical hull to effect rotation thereof, elongated enclosed cabins mounted to said shaft means exteriorly of said hull, said hollow shaft means providing a passageway formed to communicate through said hull between said frame assembly and said cabins, said cabins being buoyant and seaworthy, and selectively detachable coupling means on said shaft for instantaneous decoupling of the cabins therefrom.

2. A marine vessel as described in claim 1 and wherein said coupling means comprises a quick-release flange assembly with explosive bolts.

3. A marine vessel as described in claim 1 and where said detachable, elongated cabins are provided with auxiliary guidance and water propulsion means whereby said cabins are independently navigable as marine vessels.

4. A marine vessel as described in claim 1 and wherein said auxiliary guidance and water propulsion means comprises a water rudder, and a propeller formed for operation in a standard nautical manner.

* * * * *